United States Patent
Kristensen et al.

(10) Patent No.: US 9,833,925 B2
(45) Date of Patent: Dec. 5, 2017

(54) MANUFACTURING METHOD FOR A HIGH DURABILITY, HIGH INSULATING COMPOSITE TIMBER MEMBER AND A COMPOSITE TIMBER MEMBER

(71) Applicant: Royal Termo Træ ApS, Aalborg SV (DK)

(72) Inventors: Lars Højmann Kristensen, Aalborg SV (DK); Finn Borg, Karby (DK)

(73) Assignee: SAGA Wood Holding AS, Hønefoss (NO)

(*) Notice: Subject to any disclaimer, the term of this patent is extended or adjusted under 35 U.S.C. 154(b) by 0 days.

(21) Appl. No.: 14/841,878

(22) Filed: Sep. 1, 2015

(65) Prior Publication Data

US 2016/0059436 A1     Mar. 3, 2016

(30) Foreign Application Priority Data

Sep. 1, 2014   (DK) .......................... PA 2014 70529

(51) Int. Cl.

| | |
|---|---|
| *B27K 3/08* | (2006.01) |
| *B27K 3/48* | (2006.01) |
| *B27K 3/50* | (2006.01) |
| *B27K 5/00* | (2006.01) |
| *B27K 3/15* | (2006.01) |
| *B32B 21/04* | (2006.01) |
| *E06B 3/263* | (2006.01) |
| *B32B 5/18* | (2006.01) |
| *B32B 7/12* | (2006.01) |
| *B32B 9/02* | (2006.01) |
| *B32B 9/04* | (2006.01) |
| *C08L 91/00* | (2006.01) |

(52) U.S. Cl.
CPC ............... *B27K 3/08* (2013.01); *B27K 3/15* (2013.01); *B27K 3/48* (2013.01); *B27K 3/50* (2013.01); *B27K 5/001* (2013.01); *B27K 5/007* (2013.01); *B27K 5/009* (2013.01); *B32B 5/18* (2013.01); *B32B 7/12* (2013.01); *B32B 9/02* (2013.01); *B32B 9/042* (2013.01); *B32B 21/047* (2013.01); *E06B 3/26345* (2013.01); *B32B 2250/03* (2013.01); *B32B 2250/40* (2013.01); *B32B 2260/026* (2013.01); *B32B 2266/0278* (2013.01); *B32B 2305/022* (2013.01); *B32B 2307/304* (2013.01); *B32B 2307/554* (2013.01); *B32B 2307/5825* (2013.01); *B32B 2307/734* (2013.01); *B32B 2419/00* (2013.01); *C08L 91/005* (2013.01); *Y02B 80/28* (2013.01)

(58) Field of Classification Search
None
See application file for complete search history.

(56) References Cited

PUBLICATIONS

Finnish Thermo Wood Association, "ThermoWood Handbook" (2003).*

* cited by examiner

*Primary Examiner* — Nathan T Leong
(74) *Attorney, Agent, or Firm* — James Creighton Wray; Meera P. Narasimham

(57) ABSTRACT

The present invention describes a method for thermo-treatment of wood, where said method comprises the following steps:
 a) selecting the wood to be as free from knots as possible
 b) introducing the wood to a temperature increase up to approximately 173° C.;
 c) maintaining the wood at an ambient temperature of 173° C. for 3-5 hours;
 d) decreasing the temperature to approx. 20° C.;
 e) introducing the wood into an autoclave wherein a mixture of linseed oil and mineral oil is applied to the wood, and allowing the mixture to penetrate the wood
 f) retrieving and storing the treated wood.

Furthermore a timber member made with wood treated according to the method is disclosed.

13 Claims, 3 Drawing Sheets

MANUFACTURING METHOD FOR A HIGH DURABILITY, HIGH INSULATING COMPOSITE TIMBER MEMBER AND A COMPOSITE TIMBER MEMBER

This application claims the benefit of Danish Application No. PA 2014 70529 filed Sep. 1, 2014, which is hereby incorporated by reference in its entirety as if fully set forth herein.

FIELD OF THE INVENTION

The present invention relates to a manufacturing method for a high durability, high insulating composite timber member and a composite timber member comprising three distinct layers and a building frame component comprising a timber member manufactured according to the invention.

Furthermore, the invention is also directed at a building frame component such as a door or window frame made from a timber member according to the invention.

BACKGROUND OF THE INVENTION

It has been known for many years that heat treatment of wood will improve the wood's characteristics, specifically with respect to durability.

During the last 30 years intensive research into this has improved and refined the knowledge and the methods, and especially Finland has been a leading force in this development. The Finnish Thermo Wood Association in 2003 issued a book with the title Thermo Wood® Handbook. This handbook has since become the standard reference when it comes to heat treatment of wood and furthermore the Thermo Wood® method is by far the most widespread method of heat treating wood.

The thermo treatment method does in general terms include three phases:

A first phase where the wood to be treated is placed in a treatment chamber wherein the temperatures increase, first to around 100° C. and thereafter the temperature is slowly raised to 130° C. where high temperature drying takes place and the moisture content in the wood decreases to nearly 0. This first phase lasts approximately 36 hours.

Following the first phase is the second phase where the temperature is further increased to a temperature between 185° C. and 215° C. The elevated temperature remains constant for some hours depending on the desired outcome.

Altogether the second phase lasts approximately 16-17 hours.

Finally, the third phase is the cooling and moisture conditioning phase where once the temperature has fallen to below 80 or 90° C. re-moisturizing of the wood takes place up to a moisture content in the wood of approx. 4-7%.

After this 20+ hour treatment in the third phase the treated wood has obtained some advantageous characteristics which the wood did not have before the treatment. Most importantly the durability of the wood is increased, but also insulation properties and resistance to decay and tear and wear due to environmental influences are dramatically reduced.

Thermo-wood manufactured according to the prior art methods, even though a longer effective service life is obtained, does still have shortcomings when compared to traditional impregnated wood. In addition to the thermo treatment it is also necessary to surface treat the wood in order to protect the wood from the environment.

OBJECT OF THE INVENTION

The object of the present invention is to improve the heat treatment of the wood and at the same time introduce an environmental-friendly preserving agent to such a degree that the advantageous characteristics of the heat treatment method are improved and the durability as well as effective service life of the wood is greatly increased both in comparison with wood treated according to the thermo method but also when compared to ordinary impregnated wood.

The invention in a first embodiment provides an improved thermo-treatment process and in a second embodiment also provides an improved impregnating method as well as a timber treated by said method.

DESCRIPTION OF THE INVENTION

This is achieved by treating the wood items according to a method as set out in claim 1 where the method comprises the following steps:
  a. Introducing wood to be treated into a treatment unit;
  b. Increasing the temperature and/or pressure to a first elevated level inside the treatment unit and maintaining said first elevated temperature for a pre-determined period of time;
  c. Decreasing the temperature and/or pressure to a certain lower level for a certain pre-determined period of time;
  d. Retrieving and storing the treated wood.

In a further advantageous embodiment the method is further characterised in that said method comprises the following steps:
  a1) selecting the wood to be treated to be as free from knots as possible
  b1) in step b) introducing the wood to a temperature increase, said first elevated temperature level being in the range of 170° C. to 175° C.;
  c1) maintaining the wood at an ambient temperature in the range of 170° C. to 175° C. for between 45 minutes and up to 6 hours;
  d1) in step c) decreasing the temperature to said lower level in the range of approx. 20° C. to 60° C.;
  e1) before step d) introducing the wood into an autoclave or if the treatment unit is suitable, and applying a mixture of linseed oil and mineral oil to the wood, and allowing the mixture to penetrate the wood The method according to the present invention is carried out at a temperature maximum of approx. of 170° C. to 175° C., the duration for which this temperature is maintained at his level is typically around 3 hours, but may vary depending on wood quality, desired treatment outcome and other factors. This particular method step is very important in that the heat treatment method reshapes the wood structure at a microscopic level such that heat treated wood will have a much more orderly structure (see FIG. 4).

The change in properties and also the change in appearance are mainly due to the thermic degrading of hemicellulose which is part of the wood's cellular structure.

The insulating properties increase dramatically in that wood treated according to the present method will have an increased insulation ability of up to 35%. Also the relatively short time in which the wood is kept at the temperature of around 173° C. ensures that some drying out of the wood is achieved. Typically, the interior moisture in the wood will be 5-6%. It is important not to completely dry the wood out as the drying process may deform the wood or create cracks or other deficiencies.

At this stage the wood is introduced into the autoclave or if the treatment unit is suitable, i.e. has the capability to act as an autoclave, where the mixture of linseed oil and mineral oil will penetrate the wood structure. The penetration of the oil mixture replaces at least part of the air in the wood. The mixture of linseed oil and mineral oil has a number of advantages.

With respect to penetration, the small molecular size of the oils used and the retarding hardening of the mixture of linseed oil and mineral oil, the present invention provides an ingress of linseed oil and mineral oil typically 60 mm from the surface of the wood, whereas traditional impregnated wood of comparable quality will have penetration depth of 3-4 mm. The present invention thereby achieves an impregnation depth approx. 1500% deeper than traditional impregnating processes.

A factor in this deeper ingress is the small size of the molecules of the mixture, but also the slower hardening of the linseed oil due to the presence of mineral oil. This allows the mixture to remain more fluid for longer, thus allowing the mixture to penetrate deeper into the wood. At the same time the linseed oil in combination with the mineral oil is much more environmental-friendly as compared to the substances used for impregnation.

Furthermore, the method according to the present invention has clearly indicated that it is possible to treat larger wood items than what is possible and advised with the thermo wood method according to the Thermo-wood Handbook. In the handbook referred to above certain sizes and dimensions of the wood to be treated as well as their use have been as specified. With the present invention it is clear from the results of the method that substantially larger wood items may be treated in the combined method, i.e. thermo treatment and autoclavation with oil mixture, without any of the side effects normally associated with large wood items such as cracking, distortion, swelling and shrinkage. These effects do not occur with the treatment of the wood and as such the present invention appears to be substantially more lenient on the wood, and a better product is obtained with the inventive method. Therefore the milder combined method altogether provides increased characteristics compared to prior art methods and at the same time provides for dimension stable treatment which allows larger items to be treated. This in turn also allows for the wood to be used in a wider variety of uses than hitherto possible and advised by the thermo-wood handbook.

In a further advantageous embodiment the method further prescribes that before or at the same time as step b, replacing the air and vapor inside the treatment chamber with an inert gas.

This is a significant embodiment and a great improvement to the thermo-treatment process.

When wood is heated up in order to modify it, the wood is put under stress. Water inside the wood will transform into vapor form (start boiling) and therefore increase significantly the pressure in the wood cells, leading to deformation and cracking of the wood.

In the current process, in order to solve the problem of pressure induced stress, the atmosphere around the wood inside the treatment unit is controlled in such a way that the pressure inside and outside the wood is the same. This is achieved by vaporizing water in the reactor, building up the pressure as the temperature increases. The pressure target corresponds to a relative humidity of roughly 90%, which keeps the temperature of the wood just below the boiling point at all times as the temperature increases and decreases during the modification process. Expressed in a different way, the aim of the process is to keep the relative pressure inside the wood close to zero. Relative pressure being the difference between the pressure inside and outside the wood.

Thus the stress induced during the thermal modification/thermo-treatment process is primarily related to the movement of water out of (drying) and into the wood. This type of stress may cause quality problems, in particular cracking, if the process is not carried out in a very controlled manner. Another related problem is the condensation of water on the wood which may lead to discoloring and increased variability in other quality parameters (compared to parts of the wood where condensation did not happen).

The problem with the process is that under industrial conditions it is quite complicated to control optimally. This leads to at least two problematic issues with the process. Firstly, due to deviations from a balance between inside and outside (water vapor) pressure, stress is induced and with it potential quality costs, maybe especially for more prone species (hardwoods). Secondly, because of the way in which steam pressure is built and controlled, it causes significant delays in the heating and cooling phases. Therefore the process is more time consuming which again results in a more costly process.

Therefore when replacing the water vapor with an inert gas control of the process becomes easier, and the vapor problems described are minimized.

By further, as disclosed in further advantageous embodiments, maintaining the pressure of the inert gas introduced into the treatment unit at a pressure higher than the vapor pressure inside the wood to be treated and further/optionally further keeping the pressure of the inert gas introduced into the treatment unit maintained at a pressure higher than the boiling point of the water in the wood further advantages are achieved.

Normally a situation where the pressure outside the wood is maintained higher than the pressure inside the wood would cause the wood to swell and induce stresses in the wood structure. However by using an inert gas this is avoided. At the same time control of the entire process is significantly easier, as the control of the inert gas, which does not react in the treatment unit, is much easier than controlling the steam which interacts with the wood.

In this connection the term inert gas shall be understood as a gas which does not undergo chemical reactions under a set of given conditions, within the context of the present invention the given conditions shall be understood as any of the processes in which the inert gas is included.

The noble gases often do not react with many substances. Inert gases are used generally to avoid unwanted chemical reactions degrading a sample. These undesirable chemical reactions are often oxidation and hydrolysis reactions with the oxygen and moisture in air. The term inert gas is context-dependent because several of the noble gases can be made to react under certain conditions.

Purified argon and nitrogen gases are most commonly used, also within the context of the present invention, as inert gases due to their high natural abundance (78% $N_2$, 1% Ar in air) and low relative cost.

Unlike noble gases, an inert gas is not necessarily elemental and is often a compound gas. Like the noble gases the tendency for non-reactivity is due to the valence, the outermost electron shell, being complete in all the inert gases.[2] This is a tendency, not a rule, as noble gases and other "inert" gases can react to form compounds.

The inert gases are obtained by fractional distillation of air. For specialized applications, purified inert gas may be produced by specialized generators on-site. They are often used aboard chemical tankers and product carriers (smaller vessels). Benchtop specialized generators are also available for laboratories.

Because of the non-reactive properties of inert gases they are often useful to prevent undesirable chemical reactions from taking place. Food is packed in inert gas to remove oxygen gas. This prevents bacteria from growing. Chemical oxidation by oxygen in air is avoided. An example is the rancidification of oil. In food packaging, inert gases are used as a passive preservative, in contrast to active preservatives like sodium benzoate (an antimicrobial) or BHT (an antioxidant).

For autoclaves used for steam treatment of various items, also wood, the autoclave is connected to a steam-generator. The installation used for carrying out the present invention, is however connected to a pressure unit, from which the inert gas—typically $N_2$, is fed to the reactor unit. The gas may be recycled, washed and reused.

In a further advantageous embodiment the linseed oil has been distilled prior to being applied in step e) where nutrients have been removed from the linseed oil. In this manner the impregnation method does not feed any nutrients into the wood structure which could be used for fungus and/or bacteria in order to deteriorate the wood structure. The distilled linseed oil therefore only provides advantageous characteristics with respect to durability, hardness etc. The refining step of the linseed oil is a very important factor in obtaining the advantageous features of the present invention. In particular removal of nutrients and waxes from the linseed oil provides an extremely suitable oil for wood preservation and at the same time the small molecular size provides for good penetration into the wood.

In a still further advantageous embodiment the linseed from which the oil is made is selected from linseeds grown at higher latitudes, such as between 40° to 70°, more preferred 50° to 65°. It is well-known that linseed grown at higher latitudes has different molecular structure than linseed grown further south. By selecting linseeds grown at higher latitudes the molecules are smaller and therefore more likely to penetrate further into the wood structure and thereby create a better impregnating result.

Further advantageous aspects of the invention are set out in the further dependent claims.

In particular the further embodiment wherein method step b) and/or step c) and/or step d) and/or step e) is carried out at a pressure between 3 to 10 bars more preferred 5 to 8 bars, should be noticed. At this pressure range the chemical reactions throughout the wood matrix are ensured, as the elevated pressure will help in displacing any moisture in cracks and the like, allowing for a more even heating of the wood member. Also the penetration of the oil mixture is ensured as the pressure will allow the oil mixture to move into the wood structure.

The thorough replacement of moisture and air in the wood structure also helps prevent the ingress of moisture/water, once the timber member is built into a structure. Moisture/water causes the wood to move, for example twist, which is disadvantageous when the wood is used in constructions.

The invention is also directed at a timber member comprising three distinct layers where a first outer layer, suitable to be exposed to the exterior, is selected from wood treated according to the method of the present invention, an intermediate insulation layer and a second outer layer, where said layers are adhered together to form a single member.

For a number of applications particularly as defined in a further claim it is interesting to provide a timber member which has insulating properties and at the same time at least on one side has a high resistance against tear and wear and decay. By providing a first outer layer having the properties of wood having undergone the combined thermo-treatment and oil impregnation method according to the present invention, very long lasting durability and integrity are ensured for the first layer. At the same time the first outer layer is very low on maintenance, has high resistance towards decay and is dimensionally stable with respect to moisture and temperature and as such provides a very advantageous first outer layer.

The insulation material may be selected according to circumstances, but an organic material, for example cork, having some structural ability may for a number of applications be advantageous. In other applications in-organic insulation materials such as for example PU foam or the like may be applied. With respect to the second outer layer this layer will typically be arranged in an indoor climate and as such may be selected according to the interior design. By adhering the three layers together in order to form a single member, the single member may be treated as a regular timber member, i.e. it may be worked with regular tools such as for example hand tools and machine tools and will have characteristics corresponding to a regular timber member when it comes to working the timber member in order to fit it into the construction.

On the other hand, due to the advantageous properties of particularly the first outer layer the resulting constructional elements, i.e. the worked timber member, will exhibit characteristics far surpassing a regular wood-based timber member.

From EP1662057 is known also a layered timber member. In this construction, however, traditional wood was used on both sides of the insulating member. Although this construction to a certain extent avoided the problems relating to thermal bridges (heat transfer through the construction), the side of the timber member, which in the finished construction would face the exterior, required maintenance, and the durability of the composite timber member is comparable to normal timber. With the new timber member according to the present invention the advantages of the timber member according to EP1662057 is maintained, while the durability and insulating properties is greatly increased and the requirement for maintenance drastically reduced due to the use of treated wood according to the present invention.

For these reasons the invention is also directed at a building frame component, such as a door or window frame made from a timber member according to the invention, wherein the first outer layer is oriented towards the exterior of the building into which the building frame component is to be incorporated. In this manner the advantageous properties of the heat treatment method as described above are being used in a timber member included in a building frame component. For example for door and frame members it is desirable to have an exterior surface which requires very little maintenance and at the same time has high resistance against decay, moisture, etc.

The part of the building frame component facing the interior should on the other hand be suitable to be chosen relatively freely in order for the interior design to fulfil its purpose, i.e. to be a pleasing part of the interior design.

By using a timber member according to the invention as described above, it is possible to combine these features and at the same time, due to the intermediate insulating layer, avoid creating thermal bridges and thereby in addition to achieving the good characteristics described above also avoid the formation of thermal bridges.

DESCRIPTION OF THE DRAWING

The invention will now be described with reference to the accompanying drawings in which.

DETAILED DESCRIPTION OF THE INVENTION

Figure 1:
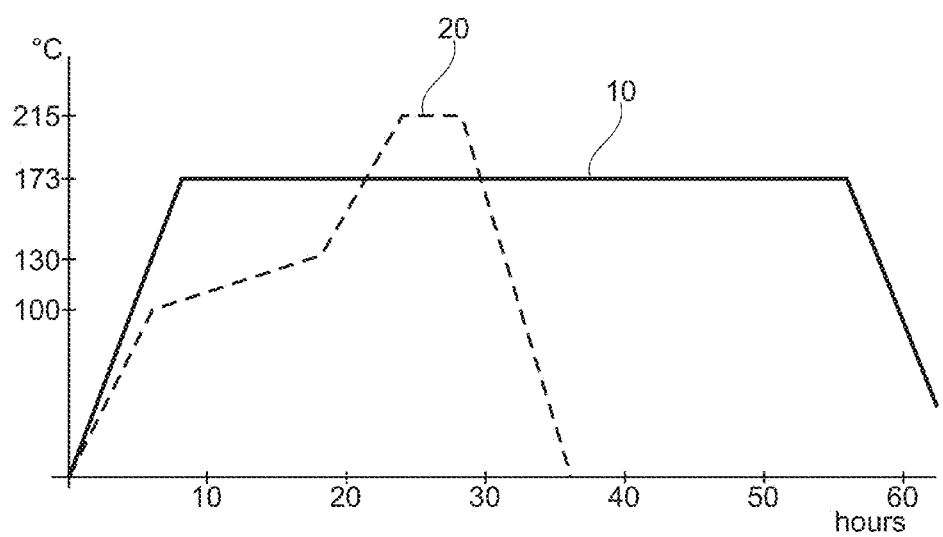
FIG. 1 illustrates schematically the heat treatment which the selected wood according to the present invention is subjected to FIG. 2 illustrates a schematic overview of the method according to the present invention

In FIG. 1 is schematically illustrated the heat treatment which the selected wood according to the present invention is subjected to. The selected wood is introduced into a chamber and during a period of 6-16 hours the temperature is increased up to a temperature in the range of 170 to 175° C., preferably constant around 173° C. At this temperature level any excess moisture in the wood will evaporate such that the moisture content will be approx. 5-6%. At the same time chemical changes will take place in the wood structure such that a much more orderly structure is achieved, see FIG. 4. The changes in the wood are both physical, but also chemical in that as already mentioned above most of the changes are caused by thermic degrading of hemi-celluloses. By maintaining the temperature at 173° C. for approximately 3-5 hours as indicated by the curve 10 the wood will change its structure both chemically and physically such that any irregularities or cracks and the like in the wood do not turn into major deficiencies which could otherwise cause the wood item to be discarded. The milder heat treatment slowly transforms the wood into a heat treated wood and the following impregnating process with the oil mixture where the advantages and characteristics of the present invention, among others an increased insulating property without losing its integrity, durability or strength, is obtained.

The traditional thermo wood treatment is illustrated in the dashed line 20, and it is clear that the treatment involves more severe changes which although improving the wood's characteristics do not obtain the same advantages as with the present invention.

Figure 2:
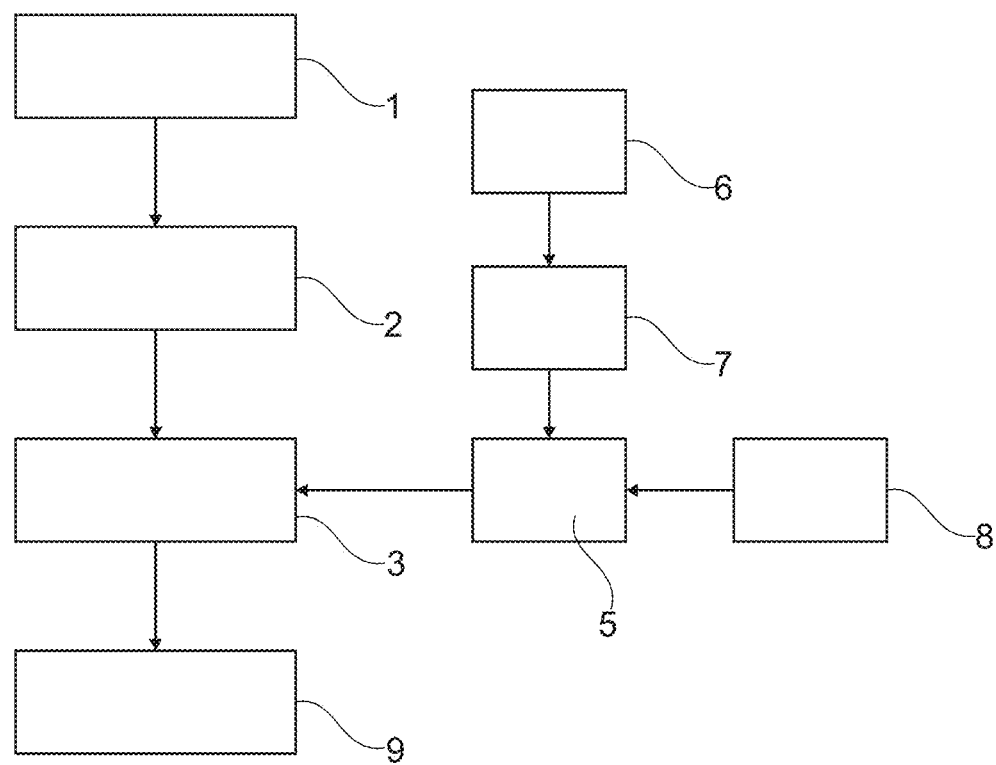

In FIG. 2 is illustrated a schematic overview of the method according to the present invention. In step 1 wood is selected 1. The selection criteria for the wood are not very harsh, but it is desirable to treat wood with as few knots as possible and without severe cracking or other defects.

As opposed to the advice given in the thermo wood handbook mentioned above, it is also possible with the present invention to treat sideboards which are a special selection of wood deriving from the manner in which the timber logs are cut at the sawmill. With the thermo wood procedure described in the thermo wood handbook sideboards are discouraged from treatment in that the treatment may cause bending, skewing or other defects giving the thermo wood method a high percentage of defects when sideboards are treated. However, with the present milder treatment method the advantages of the present invention are obtained without generating a high percentage of boards that need to be discarded.

After selection of the wood for treatment the wood is introduced into the thermo treatment facility 2. In this stage the wood is treated as explained with reference to FIG. 1 where the temperature is controlled to follow the curve 10.

After having gone through the thermo treatment as discussed above with reference to FIG. 1 the thermo treated wood is introduced into an autoclave 3. At the same time a mixture of linseed oil and mineral oil is also introduced into the autoclave 3 where the mixture 5 is derived by taking regular linseed oil 6, distilling and refining the linseed oil in a step 7 and mixing it with a mineral oil 8 to obtain the mixture 5 which is added to the autoclave 3 in the method of impregnating the thermo treated wood.

Once the wood has undergone the treatment method in the autoclave 3 it is taken out of the autoclave and stored at 9. At this stage the wood has obtained the advantages, i.e. high durability, wearability and insulation properties due to the thermo treatment, and furthermore has been deeply impregnated with an environment-friendly impregnating agent such that the wood has overall improved characteristics.

In this connection it should be noted that the impregnating agent, i.e. the mixture of refined/cleaned linseed oil and mineral oil, is relatively slow to harden as compared to raw linseed oil, and in this manner during the autoclave method it is possible to obtain a deeper penetration into the wood of the impregnating agent, i.e. the mixture derived at 5 as compared to regular impregnating agents.

After the wood has stored at 9 and the linseed/mineral oil mixture 5 has been allowed to cure, the wood may be used in a sandwich construction in order to obtain a timber member 11 as illustrated with reference to FIG. 3. The sandwich member is made from a layer of wood 12 treated according to the method described above with reference to FIG. 2. This wood 12 will typically be used in timber members which are exposed to the ambient environment, i.e. the exterior on a house, for example built into a door frame, window frame or the like.

In order to break the thermo bridge the timber member 11 is provided with an insulating layer 13. This insulating layer may be chosen from any suitable organic or inorganic material, but preferred materials are cork, polyurethane foam or other insulating materials.

Finally, the other side of the sandwich may be constituted by regular wood 14, but naturally also wood treated according to the invention may be positioned on the opposite side of the sandwich.

The sandwich is adhered together, and the skilled person will select a suitable adhesive/glue according to circumstances.

Figure 4:
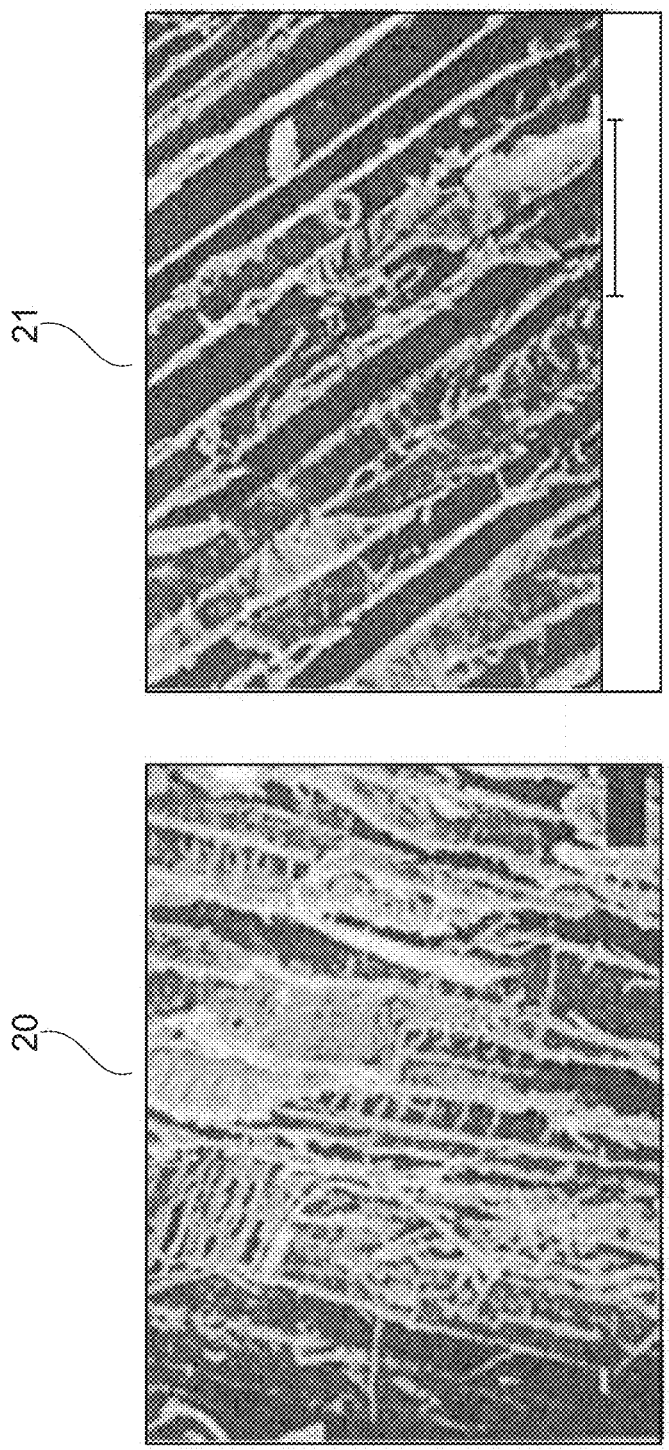
FIG. 4 illustrates microscopic pictures of untreated pinewood and pinewood exposed to a heat treatment

In FIG. 4 are illustrated microscopic pictures of untreated pinewood 20 and pinewood exposed to a heat treatment 21. It is clear that the structure of the heat treated pinewood 21 is much more structured and regular than the untreated pinewood 20.

The invention has now been explained in detail with reference to the accompanying drawings, but it is clear that the advantages obtained by the heat treatment and impregnating method using the inventive impregnating agents according to the present invention may be utilized in a number of applications, particularly in the construction industry, where it is desirable to retain the aesthetic properties of wood, but obtain a better durability and insulating properties than achievable with regular wood.

Figure 3:
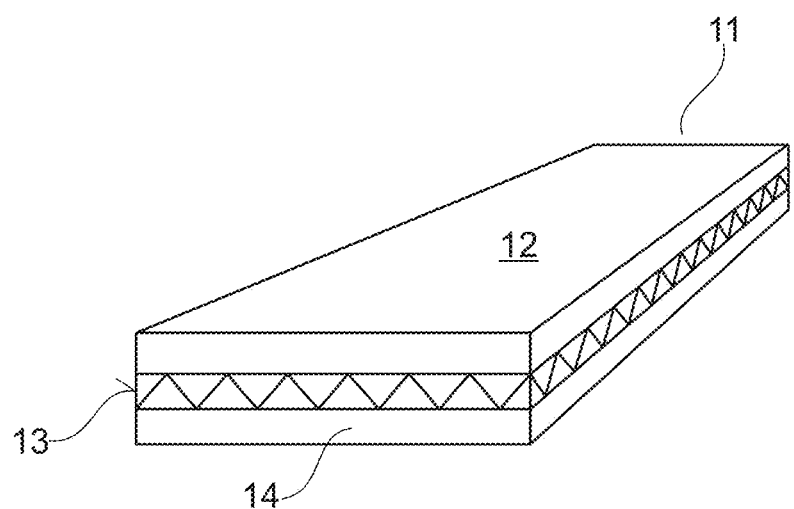
FIG. 3 illustrates a timber member

In this connection particularly the impregnating method and the insulating properties of the wood in combination with the sandwich layer construction as described with reference to FIG. 3 provide particular advantages for construction elements such as timber members used in the manufacture of doors, door frames, window frames etc.

All units are listed as metric units (meters, degrees Celcius etc).

The invention claimed is:

1. Manufacturing method for obtaining an increased durability, increased insulating composite timber member, where said method comprises the following steps:
   a. Introducing wood to be treated into a treatment unit, selecting substantially knot-free wood to be treated;
   b. Increasing the temperature and/or pressure to a first elevated level inside the treatment unit and maintaining said first elevated temperature for a pre-determined period of time, wherein said first elevated temperature level is in a range of about 170° C. to 175° C. for between 45 minutes and up to 6 hours;
   c. Decreasing the temperature and/or pressure to a certain lower level for a certain pre-determined period of time, wherein said lower level is in a range of about 20° C. to 60° C. and introducing the wood into an autoclave or into the treatment unit, and applying a mixture of linseed oil and mineral oil to the wood, and allowing the mixture to penetrate the wood; and
   d. Retrieving and storing the treated wood.

2. The method according to claim 1, wherein before or at the same time as step b, replacing the air and vapor inside the treatment chamber with an inert gas.

3. The method according to claim 2, wherein the pressure of the inert gas introduced into the treatment unit is maintained at a pressure higher than the vapor pressure inside the wood to be treated.

4. The method according to claim 3, wherein the pressure of the inert gas introduced into the treatment unit is maintained at a pressure higher than a pressure at the boiling point of the water in the wood.

5. The method according to claim 2, wherein the pressure of the inert gas introduced into the treatment unit is maintained at a pressure higher than a pressure at the boiling point of the water in the wood.

6. The method according to claim 1, wherein the linseed oil has been distilled prior to being applied in step c and wherein nutrients and/or waxes have been removed from the linseed oil.

7. The method according to claim 1, wherein linseeds from which the linseed oil is made is selected from linseeds grown at latitudes between 40° to 70°.

8. The method according to claim 7, wherein the linseed from which the oil is made is selected from linseeds grown at latitudes between 50° to 65°.

9. The method according to claim 1, wherein the wood to be treated in the method is sideboards.

10. The method according to claim 1, wherein method step b and/or step c and/or step d and/or step e is carried out at a pressure between 3 to 15 bars.

11. The method according to claim 10, wherein method step b and/or step c and/or step d and/or step e is carried out at a pressure between 5 to 13 bars.

12. The method according to claim 1, wherein the temperature in steps b and c is maintained at 173° C.

13. The method according to claim 1, wherein the temperature increase to the first elevated level in method step c or b is achieved by circulating steam containing air inside the treatment unit, where inside said treatment unit high temperature and high pressure steam is mixed with the steam containing air from the treatment unit, and said mixture is recirculated into the treatment unit by means of nozzles, where said nozzles are directed at the wood to be treated in such a manner that any gasses evaporating from the wood is quickly ventilated away from said wood;

wherein the time in step c is maintained until no more gas evaporates from the wood.

* * * * *